United States Patent Office 3,026,214
Patented Mar. 20, 1962

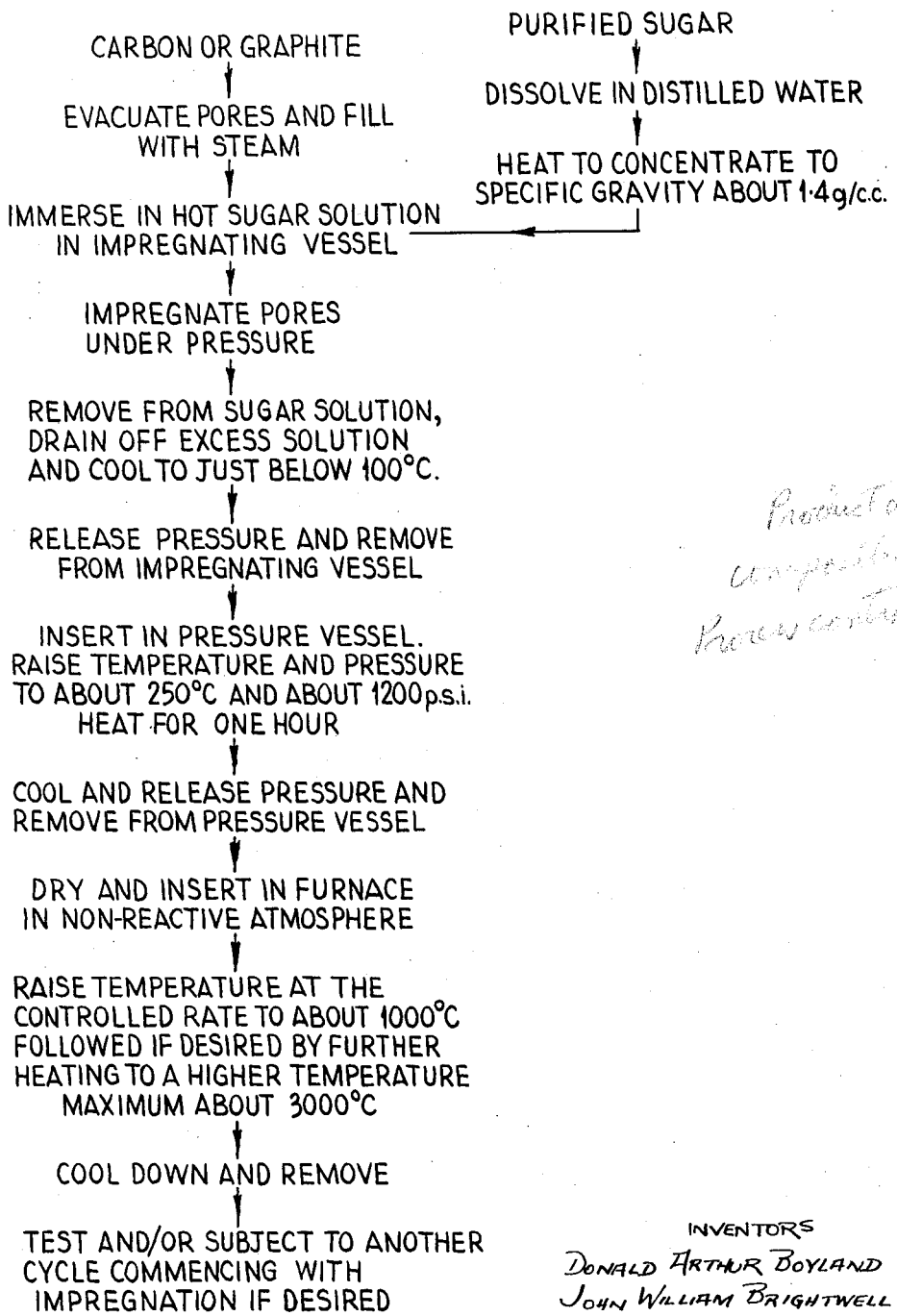

3,026,214
PROCESS FOR PRODUCTION OF LOW PERMEABILITY CARBON AND RESULTANT ARTICLE
Donald Arthur Boyland, Harrow, and John William Brightwell, Edgware, England, assignors to The General Electric Company Limited, London, England
Filed Dec. 3, 1958, Ser. No. 777,825
Claims priority, application Great Britain Dec. 13, 1957
4 Claims. (Cl. 117—46)

The present invention relates to processes for the production of low permeability carbon from carbon of higher permeability.

The permeability to liquids and gases of carbon in the form, for example, of standard commercial graphite constitutes a serious disadvantage to the use of this material for certain applications. One such application, of increasing importance at the present time, lies in the field of nuclear reactors. Taking this field by way of example, graphite is used as a moderator or reflector material in thermal and intermediate nuclear reactors and it is desirable from several points of view that this material should have as low a permeability as possible. Thus, low permeability graphite presents fewer problems when fluid cooling medium is passed through channels in a moderator made of this material so as to cool uranium or plutonium fuel elements contained within the channels, more particularly if liquid cooling medium, such as liquid metal, is employed in unlined channels in the graphite. Even with a gaseous cooling medium, where the effects of absorption possibly combined with chemical interaction are not in general so serious, it appears that mass transfer of graphite from one part of a channel to another is appreciably diminished with a low permeability graphite. Again, if the low permeability is associated with a higher bulk density so that the effect is not confined to the surface of the graphite, the efficiency of the material as a moderator or reflector is correspondingly increased.

It is an object of the present invention to provide a process for the production of low permeability carbon suitable for such applications.

According to the present invention, a process for the production of low permeability carbon from carbon of higher permeability comprises impregnating the carbon whose permeability is to be reduced with a solution of a sugar or with a molten sugar, and heating the impregnated carbon to cause carbon to be deposited within pores of the higher permeability carbon. The term "sugar" is intended to cover either a pure sugar such as sucrose or a combination of sugars.

The sugar should be purified (a table variety will normally be sufficiently pure) so that substantially the only solid product of decomposition is carbon.

We have found that solvents other than water are satisfactory. For instance, we have used acetic acid and here the effect of the process appears to be enhanced for the reason that more carbon is deposited in the pores by decomposition of the acetic acid. It will in most cases probably be essential that decomposition products of the solvent should not have adverse effect on the properties of the specimen.

Impregnation may be carried out under pressure, and it is advantageous to evacuate the pores in the carbon before filling them with the sugar solution or molten sugar. Alternatively, the pores in the carbon may be pre-filled with water vapour since the vapour will condense to a much smaller volume of liquid under pressure in the subsequent impregnating process, leaving the rest of the pores free to receive the sugar.

The temperature to which the impregnated carbon is heated in order to convert the sugar into carbon and gaseous and vaporisable products is preferably between 175° C. and 300° C. When purified sugar is heated to such a temperature under atmospheric pressure much steam is evolved as the sugar decomposes, this steam causing the carbon of decomposition to assume a "frothy" nature; and the volume of carbon "froth" produced may be as much as 10 times the original volume of sugar. The steam produced by the sugar solution in the interior of a carbon specimen might even expel part of the solution from the specimen before it had had time to decompose. In that case, the amount of carbon left in the specimen after heating to, say, 220° C. would be considerably less than the carbon content of the sugar solution with which the carbon was originally impregnated, the theoretical carbon content of table sugar being approximately 42 percent by weight. To some extent, this effect may be offset by using either molten sugar or as concentrated a sugar solution as is practicable from the point of view of successful impregnation of the carbon. However, this may not be a sufficient remedy and according to a preferred form of the invention, water formed during the decomposition of the impregnant within the impregnated carbon is prevented from vaporizing by treating the carbon in a gas at a pressure greater than the vapour pressure of water at the maximum or some predetermined temperature to which the carbon is heated in the decomposition process.

In the particular application of the invention to the production of low permeability graphite for use in nuclear reactors, a further heating stage is almost certain to be necessary. Thus, although the full effect of decreased permeability is obtained by heating the graphite in the region of 175° C. to 300° C., gaseous and/or vaporisable products from the decomposition of the sugar may still be left in the graphite in quantities sufficient to reduce, by contamination, the efficiency of a nuclear reactor in which the graphite is used; and in order to expel these products it may be necessary to heat the graphite in a further stage or further stages to approximately 1000° C., or even to so-called graphitising temperatures up to about 3000° C.

If a very low degree of permeability is required, a carbon specimen may be subjected repeatedly to the different, or all, stages of the process according to the invention.

A flow diagram of the invention is shown in the accompanying drawings.

In carrying the invention into effect according to one example of the process, a specimen of relatively high permeability carbon such as commercial graphite is introduced into an impregnating apparatus, where it is first treated so as either to evacuate the air from the pores of the carbon or to fill the pores with water vapour. The specimen is then immersed in a warm concentrated solution of purified sugar in distilled water; the specific gravity of the sugar solution should be of the order of 1.4 g./cc. or higher, and molten sugar may be used instead. Enough pressure is then applied to force the sugar solution into the pores of the carbon—if the pores are filled with water vapour, this pressure must be greater than the water vapour pressure within the pores. The specimen is then lifted out of the impregnating solution and allowed to drain, after which it is cooled, preferably to just below 100° C. and until the sugar solution becomes viscous. The impregnating pressure is then reduced and the specimen is removed from the apparatus.

The impregnated specimen is now placed in a pressure vessel or "bomb" and a gas, such as nitrogen or helium or even air if suitable, is introduced into the bomb, to a pressure of approximately 1200 p.s.i. The temperature is raised to 250° C. and during this part of the process, the sugar breaks down gradually into carbon and a high proportion of water together with other gases, vapours and a small quantity of hydrocarbon compounds. By preventing water formed during the breakdown of the sugar from vaporising into steam, which might occupy some 1500 times the volume of the water, and by reducing the volume of the other gases and vapours, the amount of deposited carbon forced out of the specimen is considerably reduced, with correspondingly more effective reduction in permeability. The heating at this stage is continued for a time long enough to ensure that substantially all the sugar in the solution has been converted to a non-fluid (i.e. non-mobile) forms; a maximum time of about 1 hour will probably suffice but it will not be difficult to determine the optimum time. The vessel is then cooled, the pressure released, and the specimen removed from the bomb. It will of course be possible to reduce pressure, if desired, at temperature, but it will require great care to prevent damage due to high rates of egress of residual water vapour, gases and other vapours. The running down period for pressure release will be far longer in those circumstances and in consequence the practice of cooling down first will probably lead to the more economical process.

If, for instance, the pressure vessel is such that there is a tendency for the water of decomposition to migrate from the pores due to vapour pressure gradients within the vessel, it may be desirable to carry out this part of the process with the specimen immersed in water. In these circumstances we have found that the degree of reduction of permeability of the specimen is greater than obtained without immersion; and this is apparently for the reason that the retention of the water of decomposition ensures the formation of the decomposition carbon as a structure filling the pore rather than as a deposit on the walls of the pore.

If the graphite is to be of high purity after treatment the specimen is now subjected to a further heating stage. This further heating should take place in non-reactive surroundings, that is either in air surrounded by graphite powder or freely in nitrogen. Alternatively, the specimen may be heated in a good vacuum. The rate of heating should be controlled. We have found however that it is possible to increase the temperature, particularly at the higher values, quite rapidly so that it may be permissible for the final temperature of about 1000° C. to be reached within a period of a few, possibly only 2 or 3, hours.

In certain circumstances however it may be necessary to have only slow rates of increase of temperature. The best programme of heating will be readily determined by experiment. This slow heating rate enables the residual gaseous or vaporisable products of decomposition to diffuse gradually out through the small remaining pores in the specimen without the formation of pockets of high pressure gas which might finally force a rapid passage to the surface of the specimen. When this stage of heating is carried out at a slow rate under vacuum, it is found that the carbonaceous material remaining after the decomposition of the sugar under high pressure at the preceding stage shrinks gradually to form a particularly dense and what appears to be, non-porous, form of carbon; and we have been able to show that graphite, impregnated in this way, had the minimum content of unwanted decomposition products while its permeability was improved by a factor of the order of 100 times after being subjected only once to the complete process.

If a further reduction of permeability is required, the graphite specimen is subsequently again subjected to the whole process, and this repeated application of the process may be continued any desired number of times. It may in some cases be found desirable to carry out a series of re-impregnations and carbonisation treatments before subjecting a specimen to the high temperature purification treatment; the best combination of the three treatments to suit a paricular specimen will be found by experiment. It may be found desirable to carry out re-impregnations in different impregnants. Alternatively or additionally it may be desired to submit the specimen to some other processing operation, such as machining, between different stages of the present process.

By the use of a process according to the invention, the permeability of grade A graphite has been reduced by a factor of 50 times in a single impregnating process, and by a factor of 1000 times by two or three impregnating processes. The weigh of a 20 gram specimen of carbon has been increased by 0.5 gram in one impregnation process, and by more than one gram by a second, or second and third impregnating process. The change in permeability has been found to be substantially stable up to temperatures of 2,700° C.

The temperature of graphite used in a nuclear reactor will vary as the load and other conditions change; the effect of these temperature changes on the permanence of the reduction in permeability caused by impregnating graphite by the process according to the invention has been tested by subjecting graphite specimens to treatment in carbon dioxide which included cycling the temperature quickly between 200° C. and 650° C. more than 1000 times. The reduction in permeability of such specimens was shown to be maintained throughout the test.

A particular advantage of the present process is that it can be effected in a comparatively short time. Thus in the case of other processes, such as a pitch impregnation process, in order to give any reasonable reduction of permeability, processing times of the order of a week or more are necessary. On the other hand, the present process, even if repeated as described above, can be completed within a matter of hours, certainly within a day.

An additional advantage which has been shown to accrue from treatment of carbon in accordance with the invention is that of enhancement of mechanical strength of the original carbon and the enhancement appears to be the greater, the greater the number of impregnations and carbonisation treatments.

We claim:
1. The process for the production of low permeability carbon from carbon of higher permeability which comprises impregnating said carbon of higher permeability substantially throughout under pressure with an impregnant in fluid form containing a high proportion of sugar, heating said impregnated carbon to a temperature in the range of 175° C.–300° C. so as to decompose substantially all the sugar contained in the impregnating fluid within the carbon, said heating being effected under conditions of gas pressure such that the water of decomposition of the sugar is prevented from vaporizing during at least the initial stage of decomposition, and subsequently cooling and depressurizing said carbon.

2. The process as claimed in claim 1 wherein the heating is carried out in a pressure vessel in which gas is pressurized to a pressure greater than the vapor pressure of water at any temperature which the carbon attains in said heating.

3. A process for the production of low permeability carbon from a carbon specimen of higher permeability which comprises introducing said specimen into an impregnating vessel, removing gases from the pores of said specimen, immersing said specimen in a sugar in a fluid state and containing water only to the extent that the fluid is of density greater than 1.4 g./cc., causing pressure to be exerted on said fluid to force it into pores of said specimen, removing said impregnated specimen from said fluid and introducing it into a pressure vessel, introducing a gas into said pressure vessel so that the impregnated specimen is contained within said gas to a pressure which is higher than the vapor pressure of water at a predetermined temperature to which the specimen is subsequently raised in the pressure vessel, heating said impregnated specimen to a temperature in the range 175° C.–300° C. so as to decompose substantially all the sugar contained in the impregnating fluid within said specimen, cooling said specimen and removing from said pressure vessel.

4. An article of carbon manufactured by the method of claim 1.

References Cited in the file of this patent

UNITED STATES PATENTS

| | | |
|---|---|---|
| 67,104 | Hadley et al. | July 23, 1867 |
| 411,016 | Edison | Sept. 17, 1889 |
| 1,620,940 | Bleeker | Mar. 15, 1927 |
| 2,174,887 | Kiefer | Oct. 3, 1939 |
| 2,618,032 | Traenkner | Nov. 18, 1952 |
| 2,880,120 | Pelle | Mar. 31, 1959 |

FOREIGN PATENTS

| | | |
|---|---|---|
| 757,883 | Great Britain | Sept. 26, 1956 |